(12) United States Patent
Yanagi et al.

(10) Patent No.: US 8,110,618 B2
(45) Date of Patent: Feb. 7, 2012

(54) PROCESS FOR PRODUCTION OF SEALING AGENT

(75) Inventors: Hideshi Yanagi, Kodaira (JP); Narukuni Hirata, Kodaira (JP); Haruki Minoshima, Kodaira (JP); Daisuke Sugio, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 154 days.

(21) Appl. No.: 12/515,479

(22) PCT Filed: Nov. 15, 2007

(86) PCT No.: PCT/JP2007/072182
§ 371 (c)(1),
(2), (4) Date: Aug. 31, 2009

(87) PCT Pub. No.: WO2008/062711
PCT Pub. Date: May 29, 2008

(65) Prior Publication Data
US 2010/0032612 A1  Feb. 11, 2010

(30) Foreign Application Priority Data
Nov. 21, 2006  (JP) .................................. 2006-314027

(51) Int. Cl.
B29C 73/00  (2006.01)

(52) U.S. Cl. ..................................................... 523/166
(58) Field of Classification Search ................... 523/166
See application file for complete search history.

(56) References Cited

U.S. PATENT DOCUMENTS

| | | | |
|---|---|---|---|
| 2003/0050365 A1 | 3/2003 | Kishida et al. |
| 2004/0010059 A1 | 1/2004 | Kojima et al. |

FOREIGN PATENT DOCUMENTS

| | | | |
|---|---|---|---|
| JP | 2003-193029 A | 7/2003 |
| JP | 2003-193030 A | 7/2003 |
| JP | 2003-342551 A | 12/2003 |
| JP | 2005-120273 A | 5/2005 |
| JP | 2006-328180 A | 12/2006 |

Primary Examiner — Edward Cain
(74) Attorney, Agent, or Firm — Sughrue Mion, PLLC (57) ABSTRACT

A sealing agent stock solution 20 is prepared by preparing a mixed solution 14 by mixing a rubber latex, a resin emulsion and a surfactant, and a predetermined amount of water in a solution preparation vessel 12, followed by adding an antifreeze agent 18 to the mixed solution 14. The sealing agent stock solution 20 is held (left standing still) at least over for 24 hr or more and preferably over for 48 hr or more without stirring in the solution preparation vessel 12, followed by filtering the sealing agent stock solution 20 with a filter member 26 made of a mesh filter having the mesh number from 50 to 400 mesh to remove latex aggregates 36 generated in the sealing agent stock solution 20, and thereby a sealing agent 10 that does not contain the latex aggregates 36 is produced.

6 Claims, 6 Drawing Sheets

PROCESS FOR PRODUCTION OF SEALING AGENT

TECHNICAL FIELD

The present invention relates to a process for production of a sealing agent that is injected inside of a pneumatic tire to seal a puncture hole of a pneumatic tire.

BACKGROUND ART

In recent years, a sealing pump-up device that, when a pneumatic tire (hereinafter, simply referred to as "tire") is punctured, without changing a tire and a wheel, injects a liquid sealing agent inside thereof, raises inside pressure of the tire up to designated pressure to repair the tire is prevailing. Among the sealing agents that are used in this kind of sealing pump-up device, there are ones that are produced by stirring and mixing a rubber latex, a resin emulsion and an anti-freeze agent made of propylene glycol. In such a process of production of a sealing agent, in general, in the beginning, the rubber latex and a tackiness agent are mixed to prepare a mixed solution, and an anti-freeze agent is injected into a vessel of the mixed solution to produce a sealing agent stock solution. However, since propylene glycol that is used as an anti-freeze agent is a viscous liquid very strong in the compatibility with water, when propylene glycol is injected in the mixed solution, moisture is rapidly absorbed from the neighboring rubber latex in contact with the propylene glycol. Accordingly, a phenomenon in that a concentration of rubber particles in the surrounding latex becomes very high, rubber particles fuse each other to form aggregates, and the sealing agent is partially or entirely solidified (gelled) with the aggregates as a core tends to occur.

As a process for production of a sealing agent, which intends to inhibit the sealing agent from generating the aggregates, a process described in, for example, Japanese Patent Application Laid-Open (JP-A) No. 2003-342551 is known. A process for production of a sealing agent, which is described in JP-A No. 2003-342551, includes an anti-freeze agent injecting and stirring step where an anti-freeze agent is injected and stirred in a mixed solution of a rubber latex and a stickiness agent contained in a cylindrical vessel. In the anti-freeze agent injecting and stirring step, with the mixed solution stirring by a rotation of a stirring blade of which tip end rotates at such a relatively high speed as 1.0 to 10.0 m/sec, the anti-freeze agent is injected from a plurality of injection ports to a surface of the mixed solution at such a relatively slow speed as 0.01 to 1.0 l/min per one injection port.

According to the process for production of the sealing agent, which is described in JP-A No. 2003-342551, with the mixed solution of rubber latex and a tackiness agent stirring at the speed described above, propylene glycol is injected at a slow injection speed little by little on a surface of the mixed solution. Accordingly, the propylene glycol is inhibited from rapidly absorbing moisture from the periphery thereof to locally raise a concentration of the latex particles. As the result, an advantage in that a plurality of latex particles in the sealing agent stock solution is effectively inhibited from aggregating to form latex aggregates is obtained.

JP-A No. 2003-342551 further describes that, after the injection of the anti-freeze agent (ethylene glycol) has come to completion in the anti-freeze agent injecting and stirring step, the stirring is preferably continued over for some (for example, 5 min or more) time. This is because, when the sealing agent stock solution is continued stirring for a definite time after the injection of ethylene glycol has come to completion, fine latex aggregates generated in the sealing agent stock solution during stirring may be forwarded to aggregate and grow; as the result, the latex aggregates may be more readily removed from the sealing agent stock solution by filtering than when the latex aggregates are present remained fine in the sealing agent stock solution.

Herein, according to knowledge of the present inventors, there is a fear in that when the latex aggregates are insufficiently removed from the sealing agent stock solution and the latex aggregates remain at a predetermined amount or more in a sealing agent as a product, a phenomenon where the sealing agent is forwarded to gel with the latex aggregates as a core is generated, the sealing ability due to the sealing agent to a puncture hole is deteriorated with time, and in a longer time span, the entire sealing agent is gelled to be incapable of injecting in a tire.

DISCLOSURE OF THE INVENTION

Problems that the Invention is to Solve

However, as the result of an experiment that the present inventors conducted to confirm advantages of a process for production of a sealing agent, which is described in JP-A No. 2003-342551, it was found that only by continuing stirring a sealing agent stock solution over a definite time followed by filtering the sealing agent stock solution, the latex aggregates were not sufficiently removed from the sealing agent stock solution, and the sealing agent produced from the sealing agent stock solution could not be completely inhibited from gelling.

The invention intends, by considering above-mentioned facts, to provide a process for production of a sealing agent, which may efficiently remove latex aggregates from a sealing agent stock solution and thereby effectively inhibit the sealing agent from gelling owing to the latex aggregates.

Means for Solving the Problems

A process for production of a liquid sealing agent according to the first aspect of the invention, is a process for production of a liquid sealing agent that contains at least a rubber latex, a resin emulsion and an anti-freeze agent for sealing a puncture hole of a pneumatic tire, the process comprising: a solution preparation step for preparing a sealing agent stock solution by mixing at least a rubber latex and an anti-freeze agent, an aggregate growing step for growing latex aggregates, in which a plurality of rubber latex particles aggregate by leaving the sealing agent stock solution prepared in the solution preparation step still for a predetermined time, and an aggregate removing step for removing the latex aggregates from the sealing agent stock solution by filtering the sealing agent stock solution which has undergone the aggregate growing step.

A process for production of a liquid sealing agent according to the second aspect of the invention, the sealing agent stock solution is left still over for 24 hours or more in the aggregate growing step in the process for production of the liquid sealing agent of the first aspect of the invention.

A process for production of a liquid sealing agent according to the third aspect of the invention, the sealing agent stock solution is left still over for 48 hours or more in the aggregate growing step in the process for production of the liquid sealing agent of the first aspect of the invention.

A process for production of a sealing agent according to the fourth aspect of the invention, the sealing agent stock solution is left still by holding the sealing agent stock solution without stirring in a solution preparation vessel in the aggregate growing step in the process for production of the liquid sealing agent of the first to third aspects of the invention.

A process for production of a liquid sealing agent according to the fifth aspect of the invention, includes a step of removing latex aggregates from the sealing agent stock solution with a mesh filter by passing the sealing agent stock solution through a mesh filter finer than 50 mesh, in the aggregate removing step in the process for production of the liquid sealing agent of any one of the first to fourth aspects of the invention.

A process for production of a sealing agent according to the sixth aspect of the invention, the rubber latex contained in the sealing agent stock solution is at least one selected from the group consisting of an, SBR latex, an NR latex, an NBR latex, an MBR latex, a BR latex, a carboxyl-modified NBR latex, and a carboxyl-modified SBR latex, in the process for production of the liquid sealing agent of any of the first to fifth aspects of the invention.

A process for production of a sealing agent according to the seventh aspect of the invention, the sealing agent stock solution contains 10 to 55% by mass of an anti-freeze agent, and the anti-freeze agent is at least one selected from the group consisting of ethylene glycol, propylene glycol, diethylene glycol and dipropylene glycol, in the process for production of the sealing agent of any one of the first to sixth aspects of the invention.

Advantages of the Invention

According to above-described processes for production of a sealing agent of the invention, latex aggregates may be efficiently removed from a sealing agent stock solution and thereby the sealing agent is effectively inhibited from gelling owing to the latex aggregates.

BEST MODE FOR CARRYING OUT THE INVENTION

In what follows, a process for production of a liquid sealing agent according to an exemplary embodiment of the invention will be described.

A liquid sealing agent produced by a process for production of a liquid sealing agent according to an exemplary embodiment of the invention (hereinafter, described as "sealing agent 10" (see FIG. 1D)), includes at least a rubber latex, a resin emulsion and an anti-freeze agent.

Herein, as the rubber latex contained in the sealing agent 10, an NR (natural rubber) latex or a synthetic rubber latex is preferably used. As the synthetic rubber latex, one kind substance selected from a group consisting of an SBR latex, an NBR latex, an MBR latex, a BR latex, a carboxyl-modified NBR latex, and a carboxyl-modified SBR latex, or a combination of at least two kinds thereof is preferably used.

Furthermore, the sealing agent 10 preferably contains an anti-freeze agent to prevent freezing in cold climates. As the anti-freeze agent, one kind substance selected from a group consisting of ethylene glycol, propylene glycol, diethylene glycol and dipropylene glycol or a mixture of at least two kinds thereof is preferred. A content of such anti-freeze agent is preferably in the range of 10 to 55% by mass. This is because when the content is less than 10% by mass, anti-freeze properties at low temperatures are not sufficiently obtained. On the other hand, when it exceeds 55% by mass, a glycol amount becomes large relative to a rubber latex amount. Accordingly, aggregated rubber latex particles are present dispersed in glycol at the time of puncture repairing and thereby sufficient seal properties are not obtained in some cases.

As the resin emulsion contained in the sealing agent 10, one kind substance selected from a group consisting of a terpene resin, a rosin resin, a tall oil resin, a phenol resin, a petroleum resin and modified products thereof or a mixture of at least two kinds thereof is preferred.

In the sealing agent 10, water may be contained to dilute, as required, and a dispersing agent, an emulsifying agent, a foam stabilizer or a pH adjusting agent such as ammonia, sodium hydroxide or the like which are commonly used may be added.

Figure 1A:
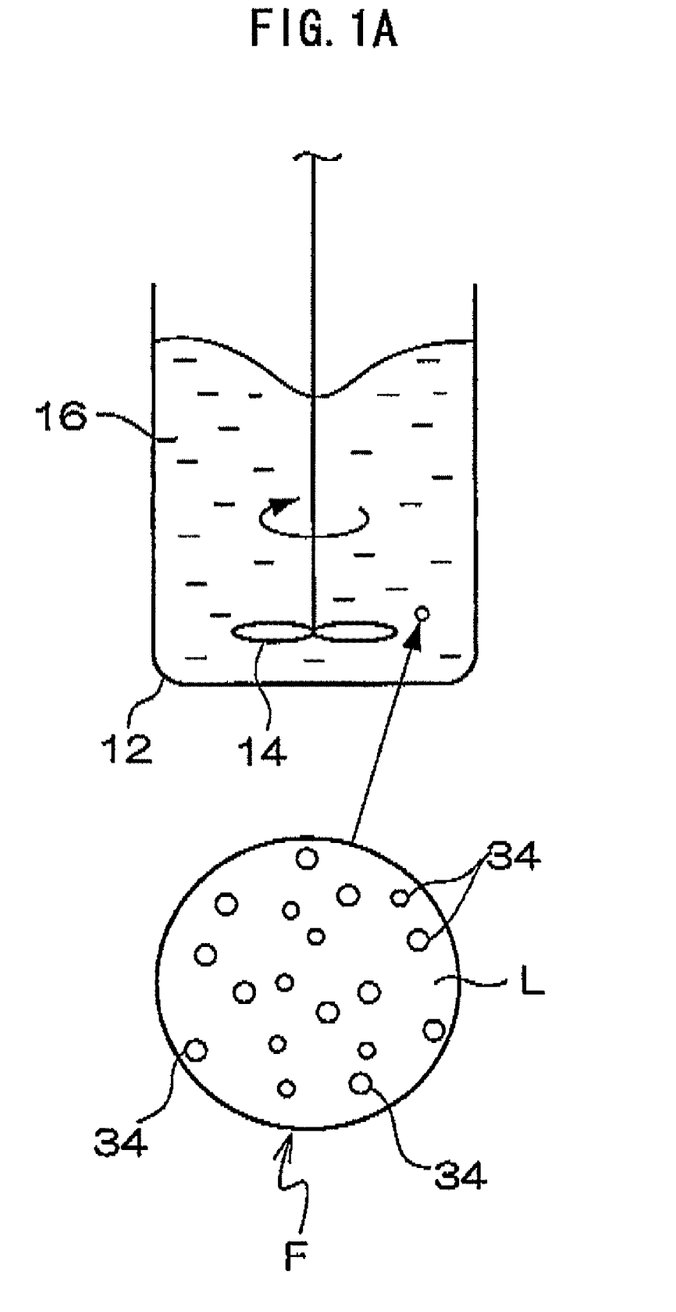
FIG. 1A is a process diagram schematically showing a part of a solution preparation step in a process for production of a sealing agent according to an exemplary embodiment of the invention, and an enlarged diagram schematically showing a state by enlarging a mixed solution produced in the solution preparation step.

In FIGS. 1A to 1D, a process for production of a sealing agent according to the present exemplary embodiment, is schematically shown. A process for production of a sealing agent according to the exemplary embodiment, includes a solution preparation step shown in FIGS. 1A to 1B. In the solution preparation step, in the beginning, as shown in FIG. 1A, among components contained in the sealing agent 10, at least a rubber latex, a resin emulsion, a surfactant, and, as required, a predetermined amount of water for controlling a concentration are charged in a solution preparation vessel 12, a stirring blade 14 held under a water surface inside of the solution preparation vessel 12 is rotated to uniformly mix the rubber latex and resin emulsion by a stirring force of the stirring blade 14, and thereby a mixed solution 16 is prepared.

Figure 1B:
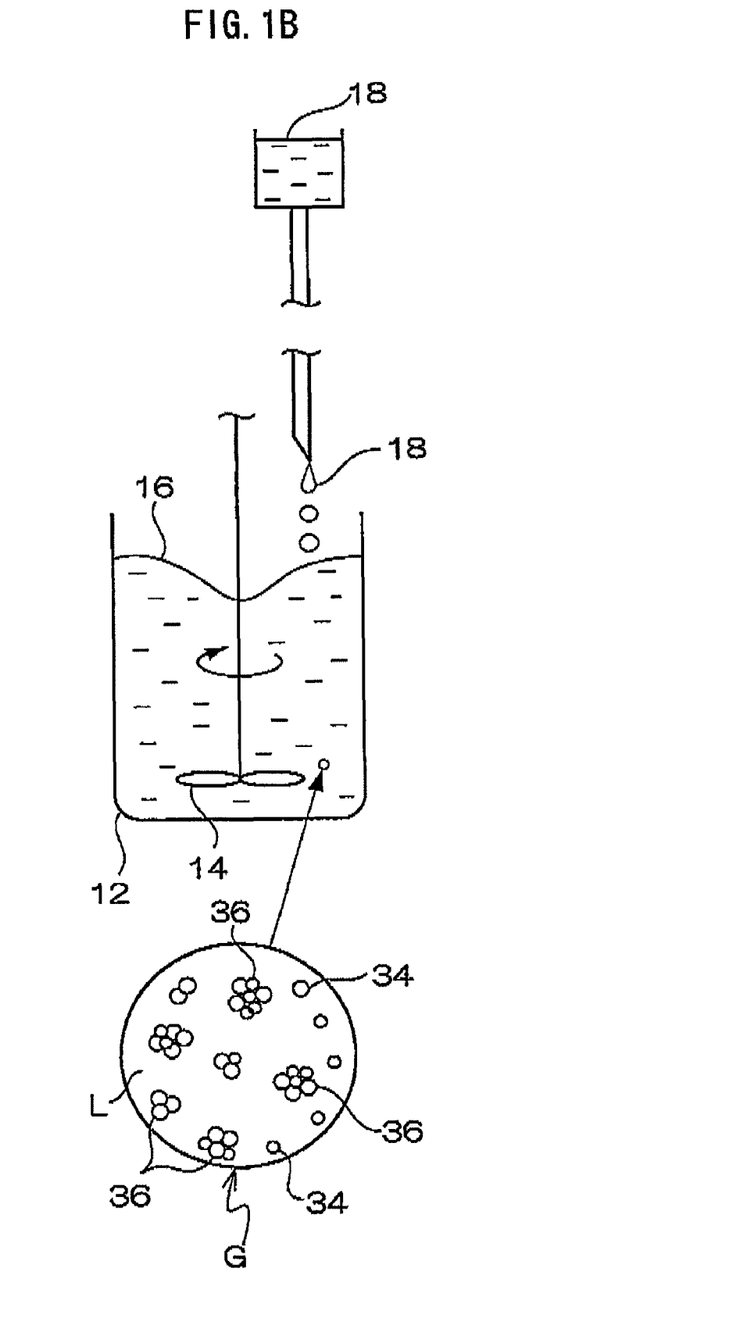
FIG. 1B is a process diagram schematically showing a part of a solution preparation step in a process for production of a sealing agent according to an exemplary embodiment of the invention, and an enlarged diagram, schematically showing a state by enlarging a mixed solution produced in the solution preparation step.

In the next place, as shown in FIG. 1B, with the mixed solution 16 stirring by the stirring blade 14, an anti-freeze agent (PG) 18 that is an anti-freeze agent is dropped on a liquid surface of the mixed solution 16 to mix a predetermined feed amount of the anti-freeze agent 18 in the mixed solution 16. At this time, the feed amount of the anti-freeze agent 18 is set so that content thereof in the mixed solution 16 may be 10 to 55% by mass.

In the solution preparation step, the anti-freeze agent 18 dropped in the mixed solution 16 is homogeneously mixed by a stirring blade 14 in the solution preparation vessel 12. Thereby, a sealing agent stock solution 20 having fundamentally same components as the sealing agent 10 (see FIG. 1E) as a product is prepared.

Figure 1C:
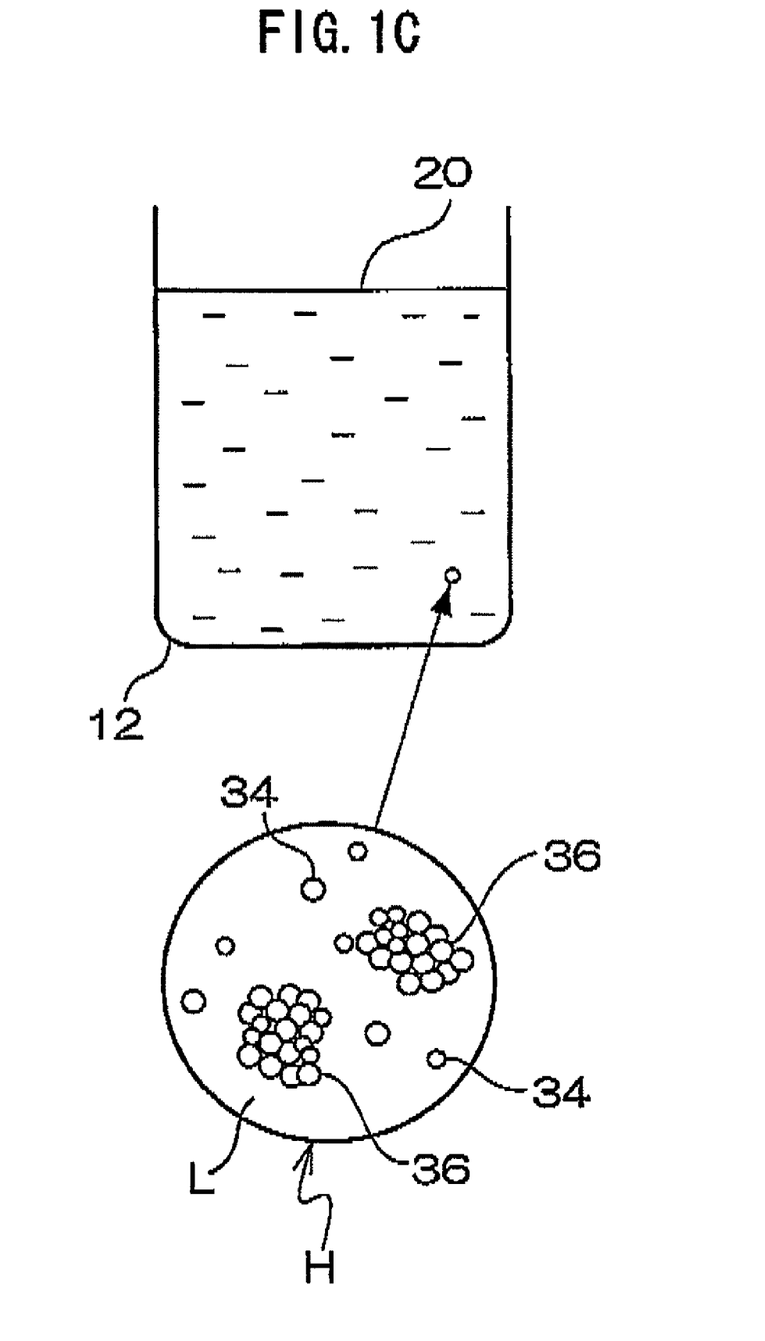
FIG. 1C is a process diagram schematically showing a part of an aggregate growing step in a process for production of a sealing agent according to an exemplary embodiment of the invention, and an enlarged diagram schematically showing a state by enlarging a sealing agent stock solution produced in the aggregate growing step.

A process for production of a sealing agent according to the exemplary embodiment, includes an aggregate growing step shown in FIG. 1C. In the aggregate growing step, the sealing agent stock solution 20 prepared in the solution preparation step is held (left standing still) without stirring for a standstill time T over at least 24 hr or more and preferably over 48 hr or more in the solution preparation vessel 12. The lower limit of the standstill time T may be appropriately varied in the range of 24 hr or more and 48 hr or less depending on the mesh number of a mesh filter that is used in an aggregate removing step (see, FIG. 1D) described below and so on.

Furthermore, the upper limit of the standstill time T is not particularly restricted. However, when a restriction on a process time (tact time) at the production of the sealing agent 10, and a restriction on a stock amount to stock the produced sealing agent 10 are considered, and when a variation of an amount of moisture during storage is considered because an amount of moisture contained in the sealing agent 10 gradually varies depending on evaporation or moisture absorption corresponding to a storage environment, the upper limit value of the standstill time T is preferably set at 480 hr or less.

Figure 1D:
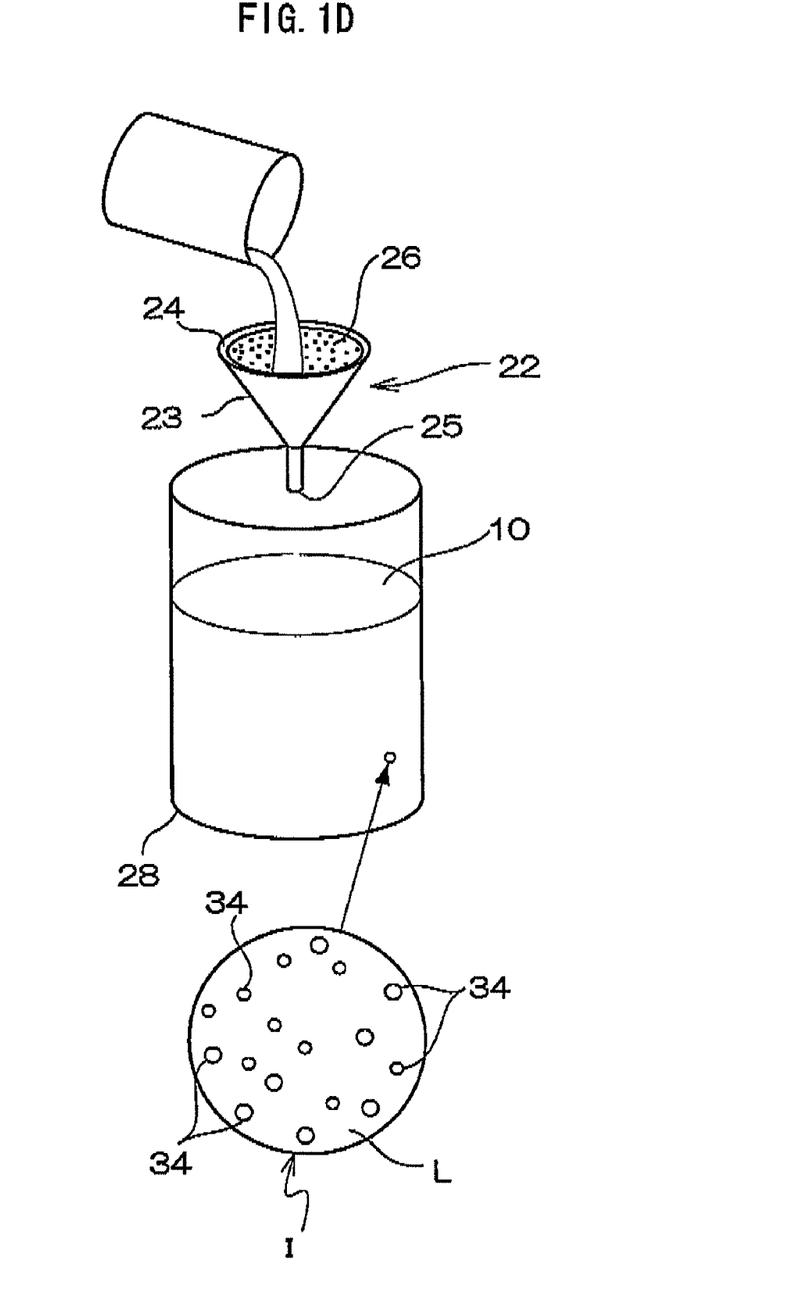
FIG. 1D is a process diagram schematically showing an aggregate removing step in a process for production of a sealing agent according to an exemplary embodiment of the invention, and an enlarged diagram schematically showing a state by enlarging a sealing agent produced in the aggregate growing step.

A process for production of a sealing agent according to the exemplary embodiment, includes an aggregate removing step shown in FIG. 1D. In the aggregate removing step, the sealing agent stock solution 20 undergone the aggregate growing step is transferred from the solution preparation vessel 12 into a stock vessel 28 while filtering the sealing agent stock solution 20 with a filter 22. Herein, the filter 22 includes an outer vessel 23 and a filter member 26 loaded inside of the outer vessel 23. The outer vessel 23 is provided with a receiving port 24 and an exhausting port 25, respectively, opened at an upper end portion and a lower end portion. The sealing agent stock solution 20 fed through the receiving port 24 is filtered with the filter member 26 loaded in the vessel, exhausted through the exhausting port 25 into the stock vessel 28 as a sealing agent 10 as a product and stored there.

As the filter member 26, a metal mesh filter formed into a wire cloth is used, and a metal mesh filter having the mesh number of 50 mesh (an opening diameter of a network is substantially 300 μm) to 400 mesh (an opening diameter of a network is substantially 30 μm) is used. Preferably, the filter member 26 having the mesh number of 100 mesh (an opening diameter of a network is substantially 120 μm) or 200 mesh (an opening diameter of a network is substantially 70 μm) is used. As a material of the mesh filter, metals such as stainless, an aluminum alloy and so on, which are high in the corrosion resistance, are preferably used. A mesh filter finer in the network than 400 mesh may be used as the filter member 26. However, the sealing tends to occur in a short time; accordingly, an exchange or cleaning period of the filter member 26 loaded in the outer vessel 23 has to be sufficiently shortened.

Furthermore, as the filter member 26, a porous filter perforated with many fine openings having an opening diameter substantially same as a network of a mesh filter from 50 mesh to 400 mesh may be used or a laminate filter obtained by laminating a mesh filter and a porous filter may be used.

As shown in FIG. 1D, the sealing agent 10 stored in the stock vessel 28 is filled in a liquid agent vessel 30 having a capacity corresponding to an amount (for example, 200 to 400 g) of the sealing agent 10 necessary for one time puncture repair, followed by closing an injection port of the liquid agent vessel 30 with an inner lid (not shown in the drawing) and an outer lid 32 to store in the liquid agent vessel 30 in a hermetically sealed state. The liquid agent vessel 30 is, with both the inner lid and outer lid are removed at the time of puncture repair of a tire, loaded to a sealing pump-up device (not shown in the drawing). The sealing pump-up device pressurizes the sealing agent 10 in the liquid agent vessel 30 with a pump to send the sealing agent 10 under pressure through a joint-hose connected to a tire valve of a tire to the inside of the tire.

In the next place, the mixed solution 16, the sealing agent stock solution 20 and the sealing agent 10 prepared in the respective steps of a process for production of a sealing agent according to the exemplary embodiment, will be described.

In FIG. 1A, a state F in which the mixed solution 16 is enlarged and observed before the addition of the anti-freeze agent 18 prepared in the solution preparation step is schematically shown. When the mixed solution 16 is enlarged and observed, many rubber latex particles 34 are floating in a solution L containing water, a surfactant and so on. At that time, the rubber latex particles 34 are floating in a state of dispersed in a solution L by an ionic repulsive force of the surfactant.

Figure 2A:
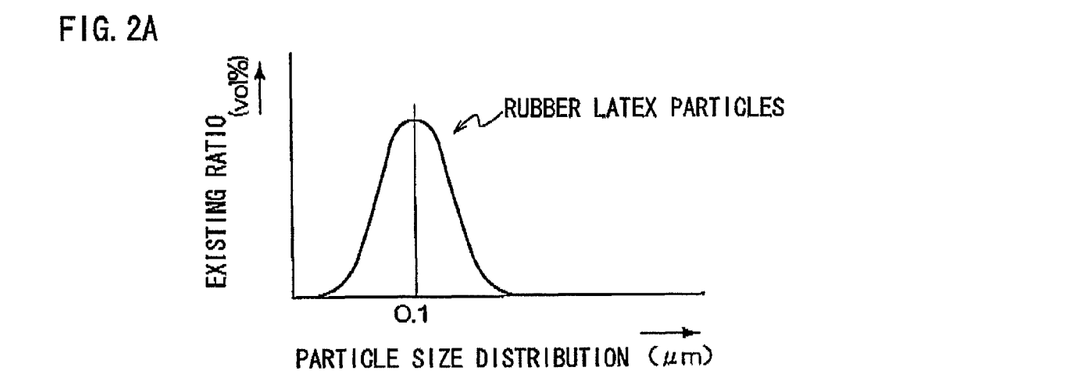
FIG. 2A is a graph showing a particle size distribution of rubber latex particles and latex aggregates contained in the mixed solution in FIG. 1.A.

When particle diameters of the rubber latex particles 34 in the mixed solution 16 are measured with a particle size distribution analyzer, particle diameters of the rubber latex particles 34 had a substantially normal distribution in the range from substantially 30 to 220 nm with a center value in the proximity of 0.1 μm (100 nm) as shown in FIG. 2A.

In FIG. 1B, a state G in which the mixed solution 16 (sealing agent stock solution 20) is enlarged and observed immediately after the anti-freeze agent 18 is homogeneously mixed in the solution preparation step is schematically shown. When the sealing agent stock solution 20 in the solution preparation step is enlarged and observed, a plurality of the rubber latex particles 34 aggregates and thereby latex aggregates 36 are generated in the solution L. This is assumed that, because the anti-freeze agent 18 added to the mixed solution 16 is a viscous liquid very strong in the compatibility with water, moisture is rapidly absorbed from the surrounding rubber latex particles 34 in contact with the anti-freeze agent 18.

Figure 2B:
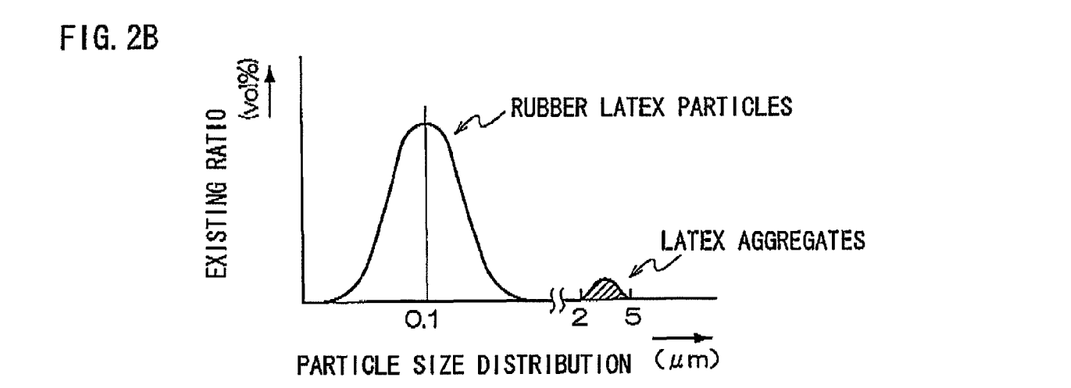
FIG. 2B is a graph showing a particle size distribution of rubber latex particles and latex aggregates contained in the sealing agent stock solution in FIG. 1B.

When particle diameters of each of the rubber latex particles 34 and the latex aggregates 36 in the mixed solution 16 are measured with a particle size distribution analyzer, particle diameters of simple body of the rubber latex particles 34 had a substantially normal distribution that is in the range from substantially 30 to 220 nm with a center value in the proximity of 0.1 μm (100 nm) as shown in FIG. 2B and same as that of the rubber latex particles 34 in the mixed solution 16 before the addition of the anti-freeze agent 18. However, the particle diameter of the latex aggregates 36 generated by aggregating a plurality of rubber latex particles 34, had distribution in the range of 2 to 5 μm.

In the case when the latex aggregates 36 such as mentioned above are present in the sealing agent 10, a phenomenon where the latex aggregates 36 form cores to promote gelling of the sealing agent tends to occur. At this time, as the existing ratio of the latex aggregates 36 increases, a time until the sealing agent 10 is gelled tends to be shorter; accordingly, the latex aggregates 36 are necessarily removed as much as possible from the sealing agent 10 in order to make the sealing agent 10 stably durable to long time storage (for example, 10 years or more).

In FIG. 1C, a state H in which a sealing agent stock solution 20 is enlarged and observed immediately after undergoing the aggregate growth step is schematically shown. When the sealing agent stock solution 20 which has undergone the aggregate growth step is enlarged and observed, it was found that a plurality of latex aggregates 36 generated in the solution L in the solution preparation step were further aggregated and the particle diameters of rubber latex particles 34 present in the solution L were found to be growing (coarsening).

Figure 2C:
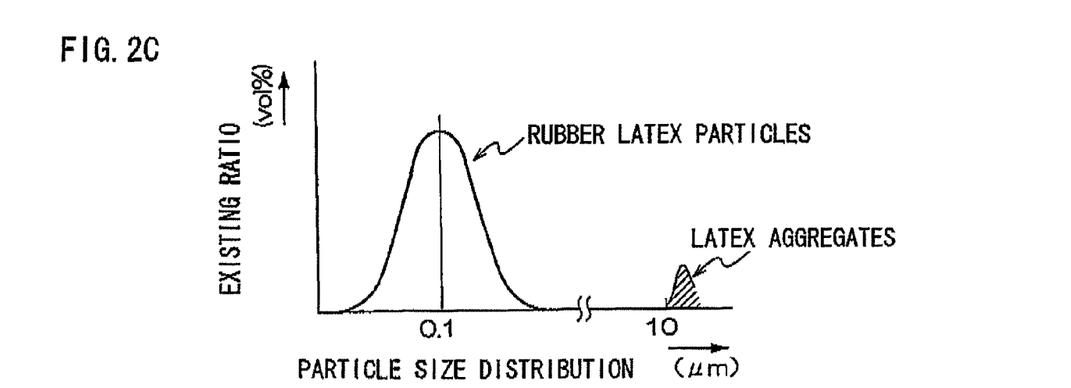
FIG. 2C is a graph showing a particle size distribution of rubber latex particles and latex aggregates contained in the sealing agent stock solution in FIG. 1C.

When particle diameters of each of the rubber latex particles 34 and the latex aggregates 36 in the sealing agent stock solution 20 are measured with a particle size distribution analyzer, particle diameters of simple bodies of the rubber latex particles 34 had a substantially normal distribution that is in the range from substantially 30 to 220 nm with a center value in the proximity of 0.1 μm (100 nm) as shown in FIG. 2C and same as that of the mixed solution 16 before the addition of the anti-freeze agent 18. However, in the latex aggregates 36 rendered coarser by further aggregating a plurality of latex particles 36, particle diameters thereof were substantially 10 μm or more (impossible of accurately measuring the upper limit value).

Furthermore, in order to compare with the aggregate growth step according to the exemplary embodiment, a sealing agent stock solution 20 held for 48 hr or more in the solution preparation vessel 12 while stirred with a stirring blade 14 was also measured for particle diameters of the rubber latex particles 34 and latex aggregates 36 by use of a particle size distribution analyzer. As the result, particle diameters of single bodies of the rubber latex particles 34 were same as the sealing agent stock solution 20 undergone the aggregate growth step according to the exemplary embodiment. However, the latex aggregates 36 were distributed in a wide range from 2 to 10 μm as a whole with some grown to 10 μm or more. This is assumed because growth and collapse of the latex aggregates 36 are simultaneously caused under influence of a stirring force.

In FIG. 1D, a state I in which the sealing agent 10 is enlarged and observed immediately after undergoing the aggregate removing step is schematically shown. When the sealing agent 10 which has undergone the aggregate removing step is enlarged and observed as shown in FIG. 1D, the latex aggregates are substantially completely removed from the solution L and the rubber latex particles 34 were dispersed and floating in the solution L.

Figure 1E:
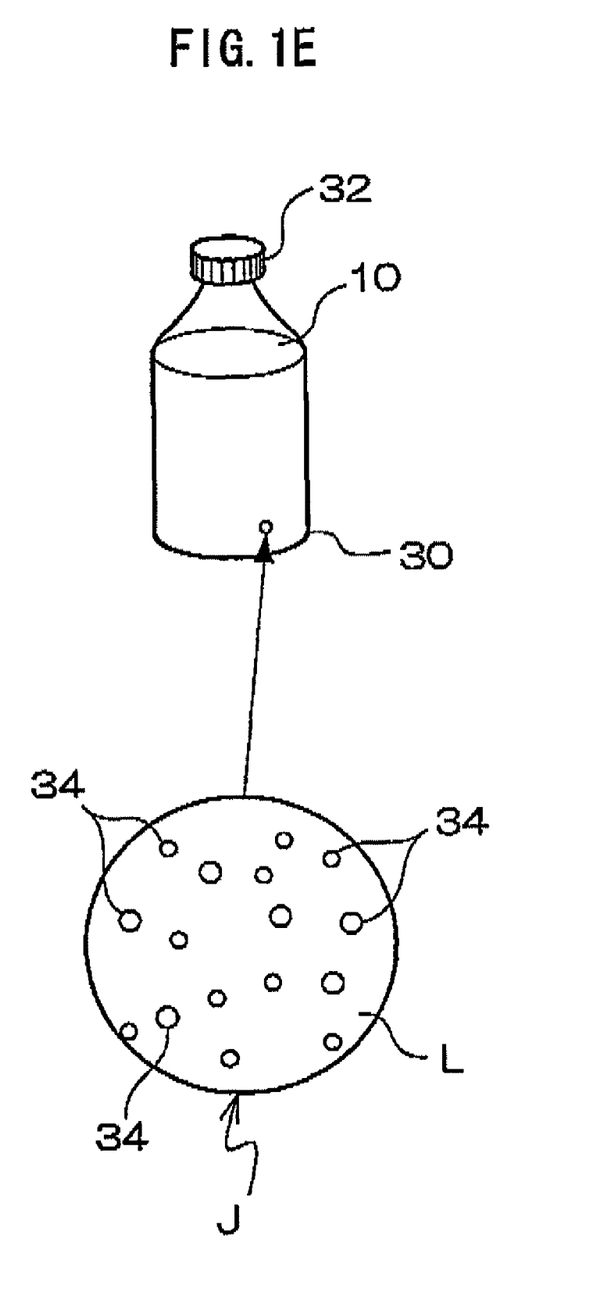
FIG. 1E is a diagram showing a sealing agent undergone an aggregate removing step in a process for production of a sealing agent according to an exemplary embodiment of the invention, and left for a definite period encapsulated in a liquid agent vessel, and an enlarged diagram schematically showing a state by enlarging a sealing agent.

In FIG. 1E, a state J in which a sealing agent 10 is enlarged and observed that is encapsulated in the liquid agent vessel 30 after undergone the aggregate removing step and left for a definite time (for example, 90 days or more under a high temperature environment) is schematically shown. When the sealing agent 10 that is encapsulated in the liquid agent vessel 30 and left for a long time is observed by enlarging, it is observed that latex aggregates 36 are neither newly formed nor the gelation is forwarded in the solution L.

As the result of the experiments of the inventors, it was confirmed that, when particle diameters of latex aggregates 36 floating in the sealing agent 10 remains as 2 to 5 μm, even if the sealing agent 10 is filtered with a filter member 26 such as a mesh filter or the like finer than 400 mesh, latex aggregates are hardly removed from the sealing agent 10. However, when the latex aggregates 36 are coarsened to a particle diameter equal to or more than 10 μm, by filtering the sealing agent 10 with a filter member 26 having 50 mesh, latex aggregates 36 having a particle diameter equal to or more than 10 μm are completely removed from the sealing agent 10.

EXAMPLES

Sealing agents (Examples A to F) produced by a process for production of a sealing agent according to the invention, and sealing agents (Comparative Examples G and H) produced by a process for production different in producing conditions from the process for production of a sealing agent according to the invention, were subjected to a measurement of an existing ratio (% by volume) of latex aggregates from 2 to 5 μm contained in each of the sealing agents and evaluation of the storability of each of the sealing agents, and results thereof are shown below (Table 1).

The existing ratio of the latex aggregates from 2 to 5 μm contained in the sealing agent was measured with a particle size analyzer LB-500 (trade name, manufactured by Horiba, Ltd.). Furthermore, a sealing agent was subjected to an accelerated test by leaving the sealing agent under a high temperature environment of 80° C., and, in a column of evaluation of the storability, when the sealing agent was gelled after leaving for 40 days, an evaluation mark of "(1)" was written, when the sealing agent was gelled after leaving for 50 days, an evaluation mark of "(2)" was written, when the sealing agent was gelled after leaving for 60 days, an evaluation mark of "(3)" was written, when the sealing agent was gelled after leaving for 90 days, an evaluation mark of "(4)" was written, and when the sealing agent was not gelled after leaving for 90 days, an evaluation mark of "(5)" was written.

TABLE 1

| | | Comparative Example G | Comparative Example H | Example A | Example B | Example C | Example D | Example E | Example F |
|---|---|---|---|---|---|---|---|---|---|
| Composition | Latex Resin Emulsion | SBR Rosin | SBR Rosin | SBR Rosin | SBR Rosin | SBR Rosin | SBR Rosin | SBR Rosin | SBR Rosin |
| | Anti-freeze Agent | PG | PG | PG | PG | PG | PG | PG | PG |
| Standstill Time (hr) | | 0 | 0 | 24 | 48 | 96 | 48 | 48 | 48 |
| Filter Member (mesh number) | | — | 50 | 50 | 50 | 50 | 10 | 50 | 200 |
| Evaluation of Storability | | (1) | (2) | (3) | (4) | (4) | (3) | (4) | (5) |
| Latex Aggregates from 2 to 5 μm (% by volume) | | 5.2 | 3.0 | 1.5 | 0.0 | 0.0 | 4.2 | 0.0 | 0.0 |

What is claimed is:

1. A process for production of a liquid sealing agent that contains at least a rubber latex, a resin emulsion and an anti-freeze agent for sealing a puncture hole of a pneumatic tire, the process comprising:

a solution preparation step for preparing a sealing agent stock solution by mixing at least a rubber latex and an anti-freeze agent;

an aggregate growing step for growing aggregates, in which a plurality of rubber latex particles aggregate to grow latex aggregates, by leaving the sealing agent stock solution prepared in the preparation step still for a predetermined time; and an aggregate removing step for removing the latex aggregates from the sealing agent stock solution by filtering the sealing agent stock solution which has undergone the aggregate growing step, wherein, in the aggregate growing step, the sealing agent stock solution is left still over for 24 hours or more.

2. The process for production of a liquid sealing agent of claim 1, wherein, in the aggregate growing step, the sealing agent stock solution is left still over for 48 hours or more.

3. The process for production of a liquid sealing agent of claim 1, wherein, in the aggregate growing step, the sealing agent stock solution is left still by holding the sealing agent stock solution without stirring in a solution preparation vessel.

4. The process for production of a liquid sealing agent of claim 1, wherein, in the aggregate removing step, the sealing agent stock solution is passed through a mesh filter finer than 50 mesh to remove latex aggregates from the sealing agent stock solution by the mesh filter.

5. The process for production of a liquid sealing agent of claim 1, wherein the rubber latex contained in the sealing agent stock solution is at least one selected from the group consisting of an SBR latex, an NR latex, an NBR latex, an MBR latex, a BR latex, a carboxyl-modified NBR latex, and a carboxyl-modified SBR latex.

6. The process for production of a liquid sealing agent of claim 1, wherein the sealing agent stock solution contains 10 to 55% by mass of an anti-freeze agent, and the anti-freeze agent is at least one selected from the group consisting of ethylene glycol, propylene glycol, diethylene glycol and dipropylene glycol.

* * * * *